(12) United States Patent
Ottoson

(10) Patent No.: US 6,526,912 B1
(45) Date of Patent: Mar. 4, 2003

(54) WEIGHTED ANIMAL FOOD DISPENSER

(76) Inventor: Nina Ottoson, Sjoasvagen 2, 41 Karlskoga (SE)

(*) Notice: Subject to any disclaimer, the term of this patent is extended or adjusted under 35 U.S.C. 154(b) by 0 days.

(21) Appl. No.: 09/807,995

(22) PCT Filed: Nov. 4, 1999

(86) PCT No.: PCT/SE99/01986
§ 371 (c)(1),
(2), (4) Date: May 4, 2001

(87) PCT Pub. No.: WO00/27185
PCT Pub. Date: May 18, 2000

(30) Foreign Application Priority Data

Nov. 10, 1998 (SE) ................................ 9803834

(51) Int. Cl.[7] ........................ A01K 1/10; A01K 39/00; A01K 5/00
(52) U.S. Cl. ........................ 119/51.01; 119/707
(58) Field of Search .................. 119/51.01, 54, 119/702, 707, 711

(56) References Cited

U.S. PATENT DOCUMENTS

| | | | | |
|---|---|---|---|---|
| 848,136 A | * | 3/1907 | Cousin | 119/711 |
| 1,006,182 A | * | 10/1911 | Smith | 119/711 |
| 1,022,112 A | * | 4/1912 | Smith | 119/711 |
| 1,031,095 A | * | 7/1912 | Smith | 119/711 |
| 1,534,964 A | * | 4/1925 | Kahnweiler | 119/711 |
| 1,789,333 A | * | 1/1931 | Costa | 119/707 |
| 2,086,631 A | * | 7/1937 | Munro | 119/711 |
| 4,907,537 A | * | 3/1990 | Shirk | 119/707 |
| 5,191,856 A | * | 3/1993 | Gordon | 119/711 |
| 5,758,604 A | * | 6/1998 | Jørgensen | 119/711 |
| 5,813,366 A | * | 9/1998 | Mauldin, Jr. | 119/707 |
| 5,819,690 A | * | 10/1998 | Brown | 119/707 |
| 5,865,147 A | * | 2/1999 | Rubin | 119/711 |
| 5,965,182 A | * | 10/1999 | Lindgren | 119/707 |
| 6,073,581 A | * | 6/2000 | Wang | 119/51.01 |
| 6,098,571 A | * | 8/2000 | Axelrod et al. | 119/707 |
| 6,109,210 A | * | 8/2000 | Nasser | 119/256 |
| 6,158,391 A | * | 12/2000 | Simonetti | 119/702 |
| 6,237,538 B1 | * | 5/2001 | Tsengas | 119/707 |

* cited by examiner

Primary Examiner—Charles T. Jordan
Assistant Examiner—Judith A. Nelson
(74) Attorney, Agent, or Firm—Dennison, Schultz & Dougherty

(57) ABSTRACT

A dispenser for use by an animal includes a base portion and an upper portion defined by at least one wall enclosing a container cavity, the at least one wall including at least one opening providing access to the container cavity. The at least one opening is disposed in the upper portion of the at least one wall. and is constructed and arranged for placement in and removal from the container cavity of units to be obtained by the animal. The dispenser further includes a weighted body fixed to the at least one wall of the dispenser in the base portion, the weighted body providing means for return of the dispenser after movement to a position defined as an upright position with the upper portion above the base portion. The dispenser can be moved on a surface in an oscillating and/or sliding motion by the animal for dispensing a unit from the at least one opening.

5 Claims, 4 Drawing Sheets

WEIGHTED ANIMAL FOOD DISPENSER

GROUND OF THE INVENTION

The invention relates to devices to be activated by animals, for dispensing items, particularly foodstuffs.

It is known that dispensers for animals are activated in the following way. A round dispenser is filled with foodstuffs. The animal then rolls the dispenser or turns it in some other way so that the foodstuff is dispensed through a hole in the dispenser. The animal thus has to roll the dispenser back and forth several times over a large area before all the foodstuff has been dispensed from the dispenser.

Many animal owners, especially dog owners, consider it a problem that the dog has to roll the dispenser over a large area to gain access to the foodstuff. When the dispenser is used indoors, it frequently rolls or is moved in under chairs and sofas and becomes lodged there. This results in the dog becoming annoyed that the dispenser has disappeared and in the owner having to find it for the dog. Another problem is that the dispenser makes a noise when it is rolled over the floor; it rattles when it rolls and neighbors living in an apartment below can be irritated by the noise.

The rolling dispenser also results in scratches on floors, especially parquet and wooden floors, which in turn results in the dog not being able to use the dispenser indoors. When the dog rolls the dispenser outdoors, this may present a problem if the ground is not level. The dispenser rolls away and may disappear by rolling under shrubs or into tall grass. The dispenser can also present a danger to the life of the dog in that it can roll out onto the road, as many dog owners have experienced.

All known devices presume that the animal must roll the dispenser or turn it in some other way to access the foodstuff inside the dispenser.

SUMMARY OF THE INVENTION

The present invention relates to a device which is activated by animals but within a limited area and the device gives the animal a greater challenge and is thereby an improvement on known devices.

The device of the invention comprises a container, which has preferably a rounded oblong or conical shape but also works in other shapes, such as angular or rounded, and can be opened by having parts in threaded screw engagement or has a hole where foodstuffs can be admitted to the dispenser. A weight is attached to the base, resulting in the dispenser always having the same initial position, i.e. it with the weight at the base. The weight acts as a counterbalance when the animal hits the dispenser to portion the foodstuff through the hole. This results in the device not rolling across large areas but moving back and forth within a small area, with the weight in the base towards the floor or ground, with the animal, especially a dog, having to work harder and use its paw to press the activator down towards the supporting surface for a piece of feed to be dispensed from the hole. When the dog removes its paw, the activator rocks back and forth a few times before resuming its initial resting position.

The weighted dispenser enables the animal, a dog in particular, to use the dispenser indoors as well as outdoors within a limited area without being interrupted by the dispenser rolling away and disappearing under a chair or shrub. Floors are not scratched, the noise is eliminated and neighbors are therefore not disturbed. The dog can use the device outdoors without danger to its life. The device results in the dog having a greater challenge and a more difficult task to perform.

The device preferably has a contoured surface to provide grip for paws when used.

The device can be provided with partition walls to make the dispensing of the feed through the hole more difficult.

The weight of the counterbalance is adapted to that of the device to provide the correct counterbalance effect.

The device can further be provided with noise-insulating material for noiseless activation. This can be achieved by a suspension device such as suspension studs 9 distributed around the lower part of the outer casing on which noise-insulating material, e.g. felt fabric, can be attached (see FIG. 4). The felt fabric can be provided with holes 11 that are threaded over the protruding suspension studs.

Alternatively, a felt bag can be slipped over the device from beneath with an elastic ribbon enabling attachment over the suspension studs.

The device can also be provided with other noise-insulating material, for instance rubber 12, that in one way or another is placed on or over the device or, alternatively, attached according to arrows 13 to the suspension studs 9.

The counterbalancing weight of the device can be made of magnetic material, such as steel, for instance. This enables the device to be placed on a supporting surface that is preferably magnetic, for instance to increase the degree of difficulty with which the animal can set the device in motion and thereby dispense the pieces of feed.

BRIEF DESCRIPTION OF THE DRAWINGS

The present invention will be further described with reference to the accompanying drawings, in which.

DESCRIPTION OF THE PREFERRED EMBODIMENTS

Figure 1:
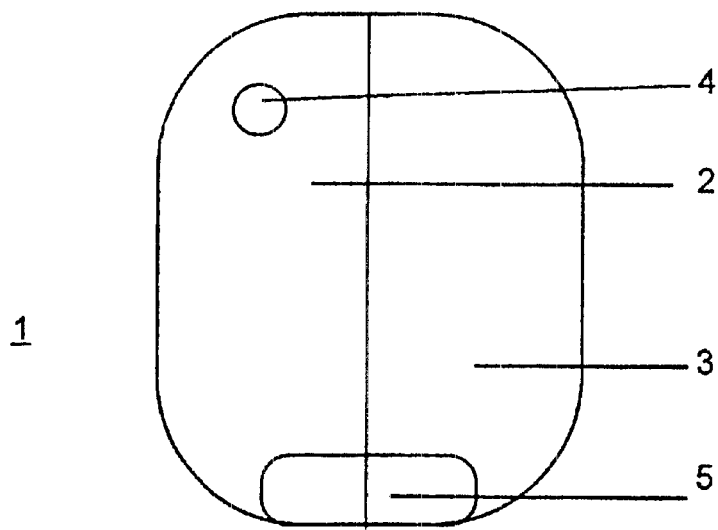
FIG. 1 shows an animal dispenser.
Figure 1:
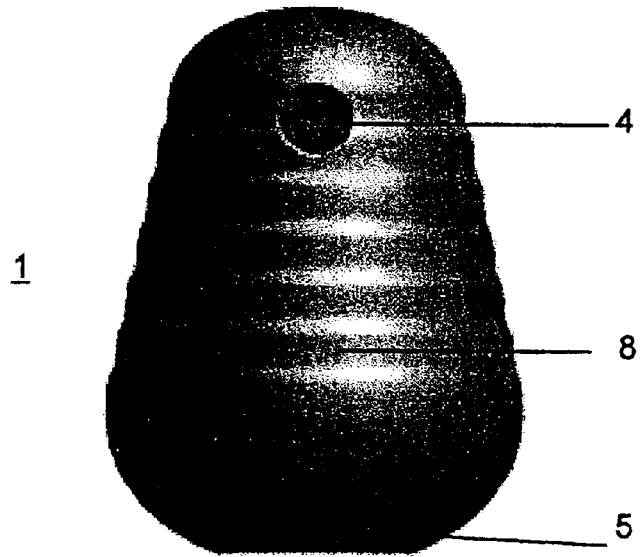
Figure 1:
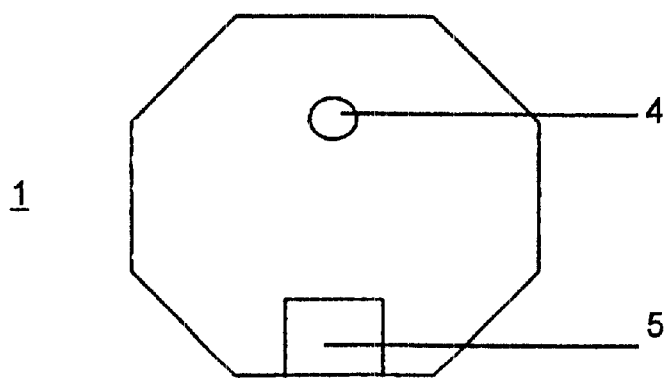
Figure 2:
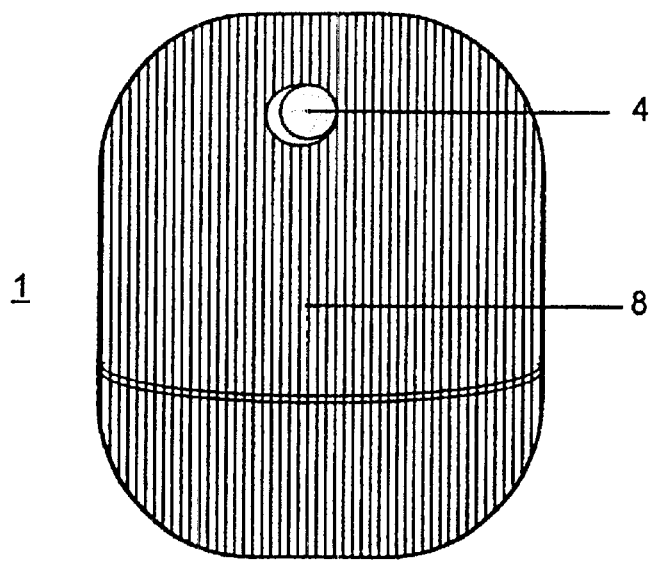
FIG. 2 shows the outer surface of an animal dispenser.
Figure 2:
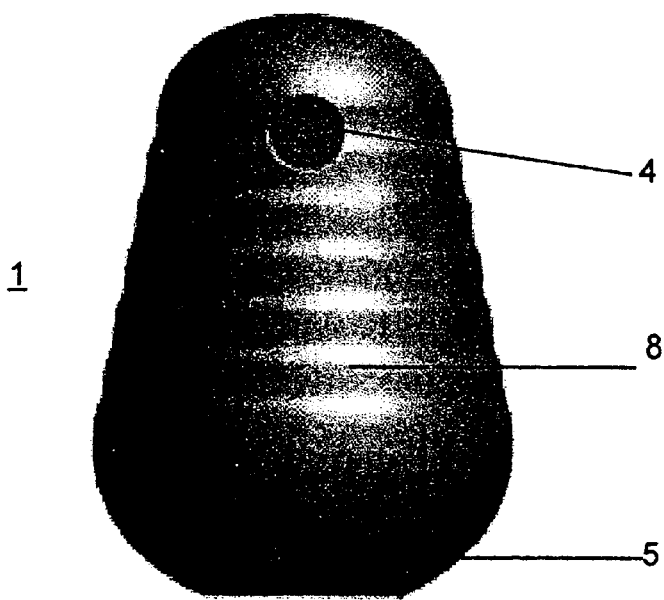
Figure 2:
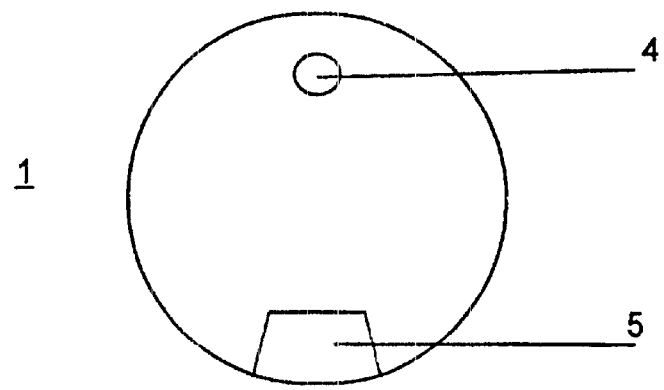
Figure 3:
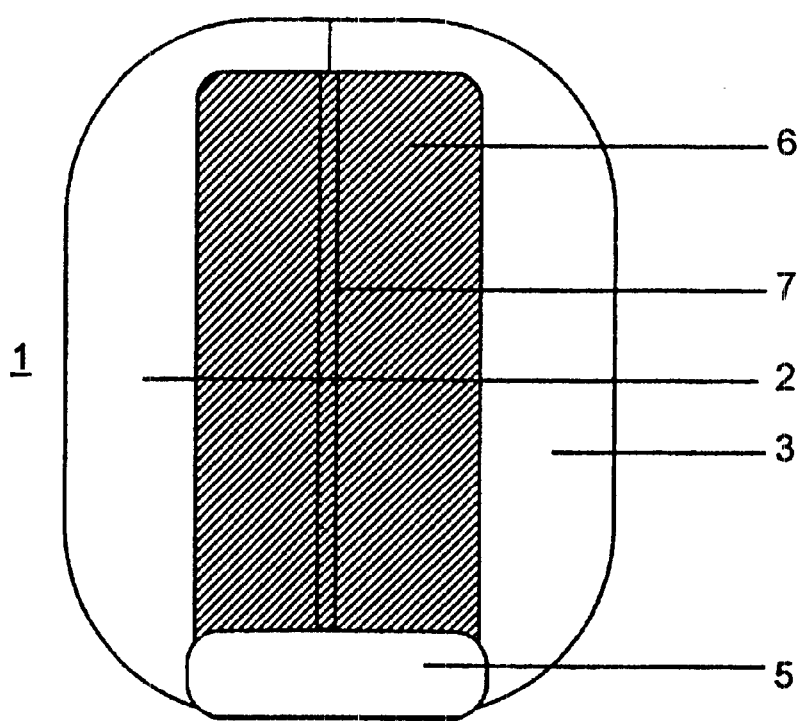
FIG. 3 shows an animal dispenser where the inner space is partitioned by two walls.
Figure 3:
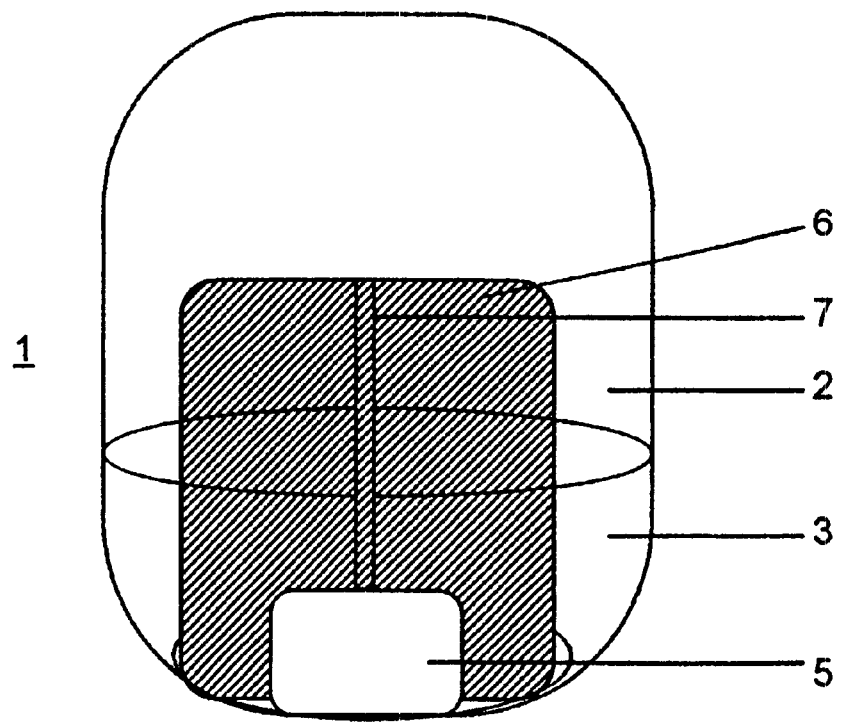
Figure 4:
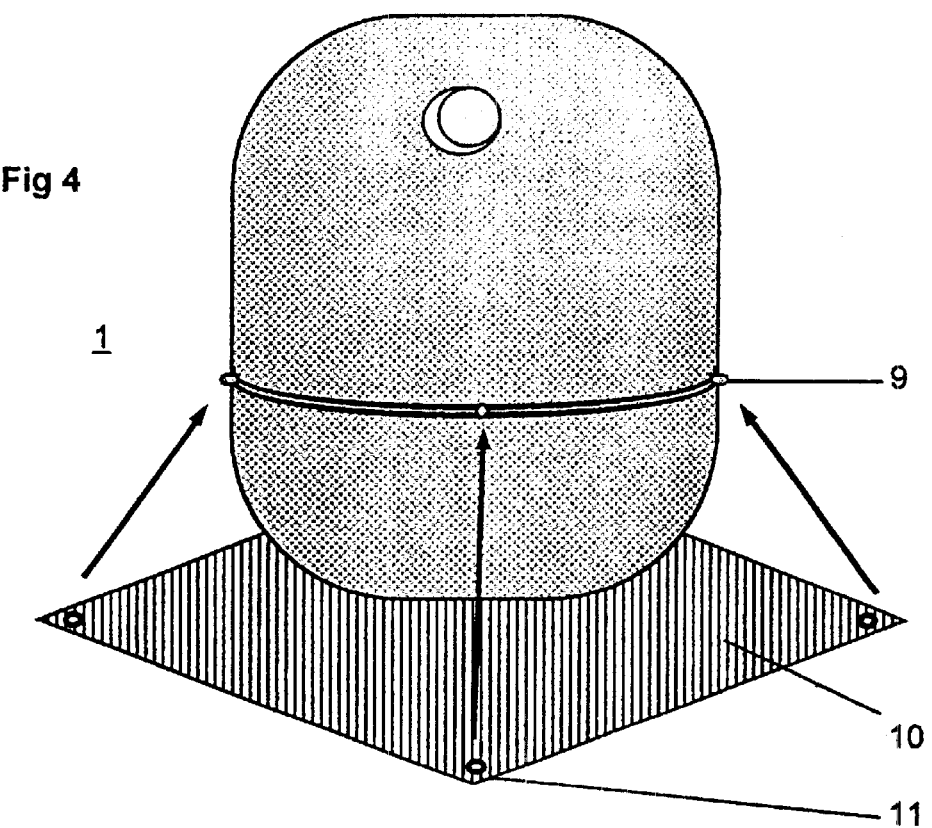
FIG. 4 shows attachment of one type of sound insulation to an animal dispenser.
Figure 5:
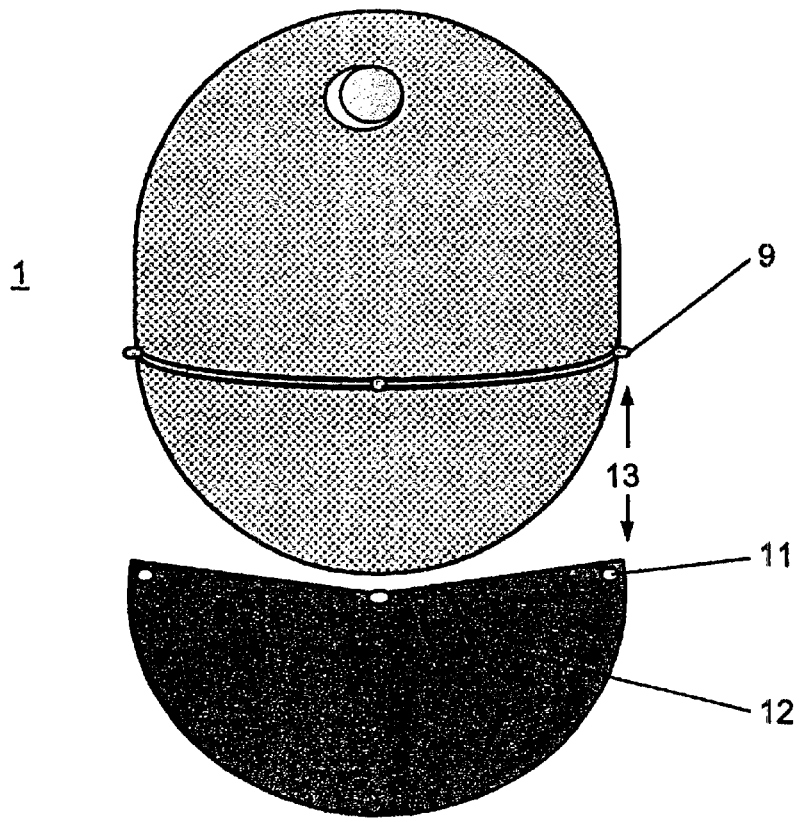
FIG. 5 shows attachment of other sound insulation material to an animal dispenser.

FIG. 1 shows dispenser 1, consisting of two parts 2 and 3. These parts can be joined to each other by welding or by some other arrangement such that the parts can be detached from each other, if need be. The dispenser is in the form of a cylinder with two end parts of a substantially spherical shape. The dispenser has a hole 4 in its wall, through which units for animal consumption can be inserted and through which such units can be dispensed during manipulation of the dispenser by an animal. The dispenser has at its base a body 5 of such weight that the dispenser 1 will always, because of the weight, assume a pre-determined position, an upright vertical position in the present case. The outer surface 8 of the dispenser 1 is rough or uneven so that, when an animal paw contacts the outer surface, the paw will not slide but will remain located where the paw contacts the surface. To make it more difficult to dispense units for animal consumption, the container space of the dispenser 1 can be divided into several sections and this can be done in any appropriate way whatsoever. In the present case, the use of two walls 6 and 7 shown in FIG. 3, perpendicular to each other has been chosen.

The dispenser can have any desired shape whatsoever. Thus, it can be spherical but it can also consist of a number of flat surfaces. Thanks to the body 5, which has a certain weight, the dispenser, in the absence of any influence, will always assume a pre-determined vertical position. When the animal tries to influence the dispenser 1, the animal can only give the dispenser an oscillating movement around the center of gravity located in the body 5. The animal can further subject the dispenser 1 to a displacement movement. Without any influence, the dispenser will always assume a vertical position.

The surface 8 of the dispenser 1 can be of several different designs, all fulfilling the requirement that a paw will not slide along the outer surface.

The dispenser has been provided with a single hole 4, but it is obvious that it can be provided with any desired number of holes. Units for animal consumption are inserted through the hole 4 and, when the dispenser is full and placed on a supporting surface, an animal will immediately try to attack the dispenser and try to dispense a unit for animal consumption. In the present case, the animal can only achieve rocking movements and displacement movements and this means that the dispenser 1 will remain in the immediate vicinity of the animal throughout the attack period, thus avoiding the above-mentioned disadvantages.

What is claimed is:

1. A dispenser for use by an animal comprising:

a base portion and an upper portion defined by at least one wall enclosing a container cavity, said at least one wall including at least one opening providing access to the container cavity, said at least one opening being disposed in the upper portion of the at least one wall and being constructed and arranged for placement in and removal from the container cavity of units to be obtained by the animal; and a weighted body fixed to the at least one wall of the dispenser in the base portion, the weighted body providing means for return of the dispenser after movement to a position defined as an upright position with the upper portion above the base portion, whereby the dispenser can be moved on a surface in an oscillating and/or sliding motion by the animal for dispensing a unit from the at least one opening.

2. A dispenser as claimed in claim 1, wherein the dispenser has an outer surface configuration comprising means for preventing an animal paw from sliding along the outer surface.

3. A dispenser as claimed in claim 1, wherein the container space comprises at least one wall to divide the space into a plurality of subspaces, each space being in communication with an opening.

4. A dispenser as claimed in claim 1, comprising two body portions united with each other in a lockable association.

5. A dispenser as claimed in claim 1, comprising a cylindrical middle portion with two spherical end portions, the weighted body being fixed to one of the spherical end portions.

* * * * *